No. 873,428. PATENTED DEC. 10, 1907.

A. HART.

VEHICLE HUB.

APPLICATION FILED MAR. 21, 1907.

Witnesses
Edwin L. Yewell
J. H. Holt

Inventor
Archibald Hart,
By W. Schoenborn,
Attorney

THE NORRIS PETERS CO., WASHINGTON, D. C.

UNITED STATES PATENT OFFICE.

ARCHIEBALD HART, OF GLEN HEAD, NEW YORK, ASSIGNOR OF ONE-HALF TO WILLIAM J. FOX, OF GLEN HEAD, NEW YORK.

VEHICLE-HUB.

No. 873,428.   Specification of Letters Patent.   Patented Dec. 10, 1907.

Application filed March 21, 1907. Serial No. 363,689.

*To all whom it may concern:*

Be it known that I, ARCHIEBALD HART, a citizen of the United States, residing at Glen Head, Long Island, in the county of Nassau and State of New York, have invented certain new and useful Improvements in Vehicle-Hubs, of which the following is a specification.

My invention relates to improvements in hubs of wheels for vehicles, and has for its objects to provide a means which is particularly and well adapted to readily detach or attach a wheel from an axle without the use of a wrench or other tool, and furthermore to construct the several parts of the attachment so that the usual external appearance of the hub or the wheel has not been altered and at the same time the parts are prevented from becoming loose or rattling or becoming clogged with dirt.

A further object of the invention is to construct an attachment which will efficiently and correctly carry out its functions and at the same time have a minimum number of parts, durability and simplicity of construction and operation and a low cost of manufacture.

My invention consists of structural features and relative arrangements of elements which will be hereinafter more fully and clearly described and particularly pointed out in the appended claims.

Figure 1:
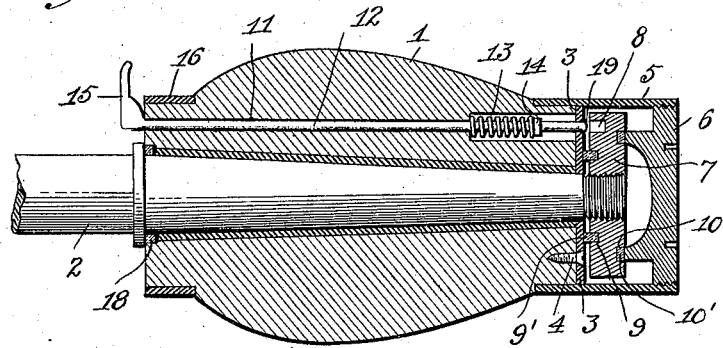
Figure 2:
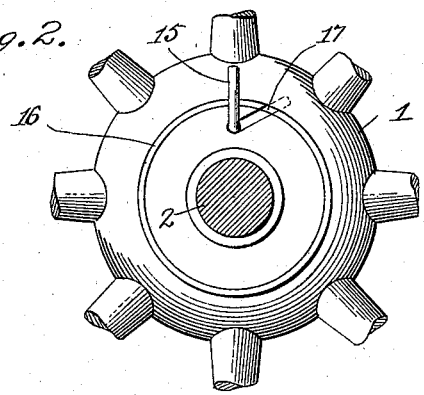
Figure 3:
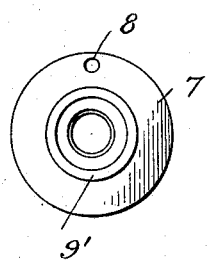
Figure 4:
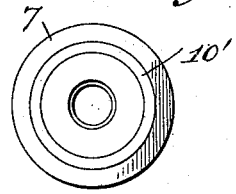

Referring to the drawing, Figure 1, is a longitudinal section of the hub of a wheel with my improvements applied thereto; Fig. 2, is a view of the inner end of the hub; Fig. 3, is a detached view of the securing nut; Fig. 4, is the reverse side of the nut.

Similar reference characters indicate the same parts in the several views of the drawings.

In the drawing, 1 represents the hub of the wheel through which the usual spindle or axle 2 projects and may be provided, if so desired, with the common types of ball bearings which form no essential part of the present invention. The outer end of the hub is preferably provided with a wearing plate 3, which is suitably secured to the hub by means of screws 4 or other fastening means. 5 is the usual collar secured to the hub which is internally screw-threaded at its outer end to receive the screw cap 6 to be presently more fully described.

7 is a nut adapted to engage the outer threaded end of the spindle or axle 2, said nut being provided with a depression, groove or perforation 8 and annular depressions or grooves 9 and 10 on its opposite sides for the purpose of retaining washers or packing strips 9' and 10' of leather or other suitable material, the functions of which will be hereinafter more fully described.

11 is a recess passing through the hub as shown, in which is passed a retaining pin 12 capable of rotation. Near the outer end of the said pin 12 is provided a coil spring 13 which is adapted to abut against a shoulder in the recess. The pin 12 has a stop 14 secured to it which impinges against the outer end of the coil spring 13. The inner end 15 of the releasing pin is bent up at right angles to that part which passes through the recess 11 and is adapted to rest against the outer edge of metallic collar 16 fastened to the inner side of the hub. Said collar 16 has a slit 17 cut into at such an angle that when the bent up end 15 of the pin 12 is turned down, as shown in dotted lines in Fig. 2, the straight section of the pin may, due to the action of the coil spring 13, be moved in the recess 11 towards the outer end of the hub. 18 is a washer between the inner end of the hub 1 and the collar on the axle 2 for the purpose of preventing any grit from getting into the bearing of the wheel.

The normal position of the releasing pin 12 when the wheel is rotating on the vehicle is such that the bent up section 15 is out of the slit 17 and rests on the outer edge or collar 16 as indicated in Fig. 1. When it is desired to attach or detach the nut 7 on the threaded end of the axle 2, it is only necessary to partially rotate or turn down the bent end 15 into the slit 17 as shown in dotted lines in Fig. 2, when the outer end 19 of the releasing pin 12 by revolving the wheel can be made to engage the slot or perforation 8 of the nut 7 and by further turning the wheel, either to the right or left, said nut 7 is screwed on or off the screw threaded end of the axle 2. It will be seen by the structural features and arrangements of the washers 9' and 10' on the nut 7 with respect to the plate 3 and the inner side of the screw cap 6 that said nut when screwed up is firmly held between the plate and cap and all possibility of it moving or rattling within the outer casing of the hub is avoided.

From the foregoing disclosure it will be seen that I have described an attachment for vehicle hubs which effects all the functions and objects as recited in the statement of invention, and while I have described one and my preferred form, it can be readily seen and understood by those skilled in the art that many changes will be readily suggested without departing from the spirit of my invention.

Having now fully described my invention what I claim as new and desire to secure by Letters Patent is:—

1. The combination with the hub of a wheel, of an axle or spindle extending therethrough, a nut fitting the outer end of the axle having a depression or opening therein adjacent to the hub, a cap engaging the hub for inclosing the nut, a rotary releasing pin extending longitudinally through a recess in said hub its outer end adapted to fit the depression or opening in the nut and its inner end bent up at right angles and rigid with the section of the pin passing through the hub, and a collar having a slit secured on the inner side of the hub in which the inner bent up end of the pin is adapted to be seated.

2. The combination with a hub of a wheel, of an axle or spindle extending therethrough, a nut fitting the outer end of the axle having annular grooves or depressions on its opposite sides and a depression or opening adjacent to the hub, packing strips in said annular grooves or depressions, a cap engaging the hub for inclosing the nut, a rotary releasing pin extending longitudinally through a recess in said hub its outer end adapted to fit the depression or opening in the nut and its inner end bent up at right angles and rigid with the section of the pin passing through the hub, and a collar having a slit secured on the inner side of the hub in which the inner bent up end of the pin is adapted to be seated.

3. The combination with a hub of a wheel, of an axle or spindle extending therethrough, a nut fitting the outer end of the axle having annular grooves or depressions on its opposite sides and a depression or opening adjacent to the hub, packing strips in said annular grooves or depressions, a cap engaging the hub for inclosing the nut, a rotary releasing pin extending longitudinally through a recess in said hub its outer end adapted to fit the depression or opening in the nut and its inner end bent up at right angles and rigid with the section of the pin passing through the hub, a collar having a slit secured on the inner side of the hub in which the inner bent up end of the pin is adapted to be seated, and a spring in said recess for normally forcing said releasing pin outwardly.

In testimony whereof I affix my signature in presence of two witnesses.

ARCHIEBALD HART.

Witnesses:
 JOHN J. DUNBAR,
 HALSTEAD SCUDDER.